(12) United States Patent
Ezrielev et al.

(10) Patent No.: US 12,248,374 B2
(45) Date of Patent: Mar. 11, 2025

(54) LAST RESORT ACCESS TO BACKUPS STORED IN VAULTS

(71) Applicant: Dell Products L.P., Round Rock, TX (US)

(72) Inventors: Ofir Ezrielev, Be'er Sheba (IL); Yehiel Zohar, Sderot (IL); Lee Serfaty, Be'er Sheba (IL)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/308,224

(22) Filed: Apr. 27, 2023

(65) Prior Publication Data

US 2024/0362126 A1 Oct. 31, 2024

(51) Int. Cl.
*G06F 11/14* (2006.01)
*G06F 21/60* (2013.01)

(52) U.S. Cl.
CPC ...... *G06F 11/1469* (2013.01); *G06F 11/1451* (2013.01); *G06F 21/602* (2013.01); *G06F 2201/84* (2013.01)

(58) Field of Classification Search
CPC . G06F 11/1469; G06F 11/1451; G06F 21/602
See application file for complete search history.

(56) References Cited

U.S. PATENT DOCUMENTS

| | | | | |
|---|---|---|---|---|
| 10,021,075 B1* | 7/2018 | Saad | ................ | G06F 11/2097 |
| 10,671,483 B1* | 6/2020 | Todd | ................ | G06F 11/1469 |
| 10,878,084 B1* | 12/2020 | Voss | ................ | G06F 11/1469 |
| 11,341,234 B1* | 5/2022 | Voss | ................ | G06F 11/1464 |
| 2017/0060699 A1* | 3/2017 | Hohl | ................ | G06F 11/1469 |
| 2019/0311040 A1* | 10/2019 | Nayak | ................ | G06F 11/0751 |
| 2021/0019235 A1* | 1/2021 | Savir | ................ | G06F 40/30 |
| 2021/0109821 A1* | 4/2021 | Natanzon | ............ | H04L 41/5025 |
| 2021/0240573 A1* | 8/2021 | Upadhyay | ........... | G06F 11/1451 |
| 2023/0123919 A1* | 4/2023 | Trachy | ................ | G06F 11/1464 714/6.3 |
| 2023/0161497 A1* | 5/2023 | Rangasamy | ........ | G06F 11/1451 711/154 |

* cited by examiner

*Primary Examiner* — Huawen A Peng
(74) *Attorney, Agent, or Firm* — Workman Nydegger

(57) ABSTRACT

Last resort access to backups is disclosed. An encrypted backup associated with a first system or vault is stored in the backup associated with another system. If a key needed to decrypt a backup in the first vault is unavailable, an encrypted copy of a backup in the second vault may be used for the recovery operation. Incremental backups from the first and/or second vault, which may be difference incremental backups and may be unencrypted, may be used in the recovery operation.

20 Claims, 5 Drawing Sheets

LAST RESORT ACCESS TO BACKUPS STORED IN VAULTS

FIELD OF THE INVENTION

Embodiments of the present invention generally relate to a data protection system. More particularly, at least some embodiments of the invention relate to systems, hardware, software, computer-readable media, and methods for protecting data and ensuring access to the data including backups is available.

BACKGROUND

Most entities rely on computing systems. These computing systems include applications and their data. Hospitals, for example, have applications that require/use/generate data related to patients, medicines, procedures, and the like. Much of this data is confidential. Airlines rely on applications and data to manage flights, passengers, employees, and more.

These entities exert substantial efforts to ensure that their data is available when needed. These efforts include generating backups of the production systems/data. Generating backups helps ensure that in the event of data loss, the production systems can be restored, and operations can resume.

Data corruption or loss, however, can occur in different ways. The loss of a disk drive due to hardware failure, for example, can usually be quickly resolved. The loss of data (e.g., inability to access the data) due to malware or other cyber threats can be much more problematic.

In the event of data loss, whether or not related to malicious actions, data may be recovered from a backup stored in a backup storage. The backups stored in the backup storage are often protected from unauthorized access. For example, a backup may be encrypted. While encrypting the backups prevent the backup from being read by an unauthorized entity that does not have the proper key, an authorized entity may lose access to the backups if the key is lost or otherwise unavailable.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Embodiments of the present invention generally relate to data protection systems and data protection operations. More particularly, at least some embodiments of the invention relate to systems, hardware, software, computer-readable media, and methods for accessing backups.

In general, example embodiments of the invention relate to data protection operations including, but not limited to, data protection operations, backup operations, snapshot operations, restore/recover operations, point-in-time backup/recover operations, malware response operations, encryption operations, backup protection operations, vault or storage operations or the like or combinations thereof.

The term malware as used herein and by way of example, may refer to ransomware, viruses, rootkits, spyware, adware, trojans, worms, phishing attacks, or other unwanted software or cyber-attacks. Malware may also be referred to as a computing process or application.

Embodiments of the invention relate to enabling access to a backup when a key required to read or access an encrypted backup has been lost, deleted, or is otherwise unavailable.

Figure 1:
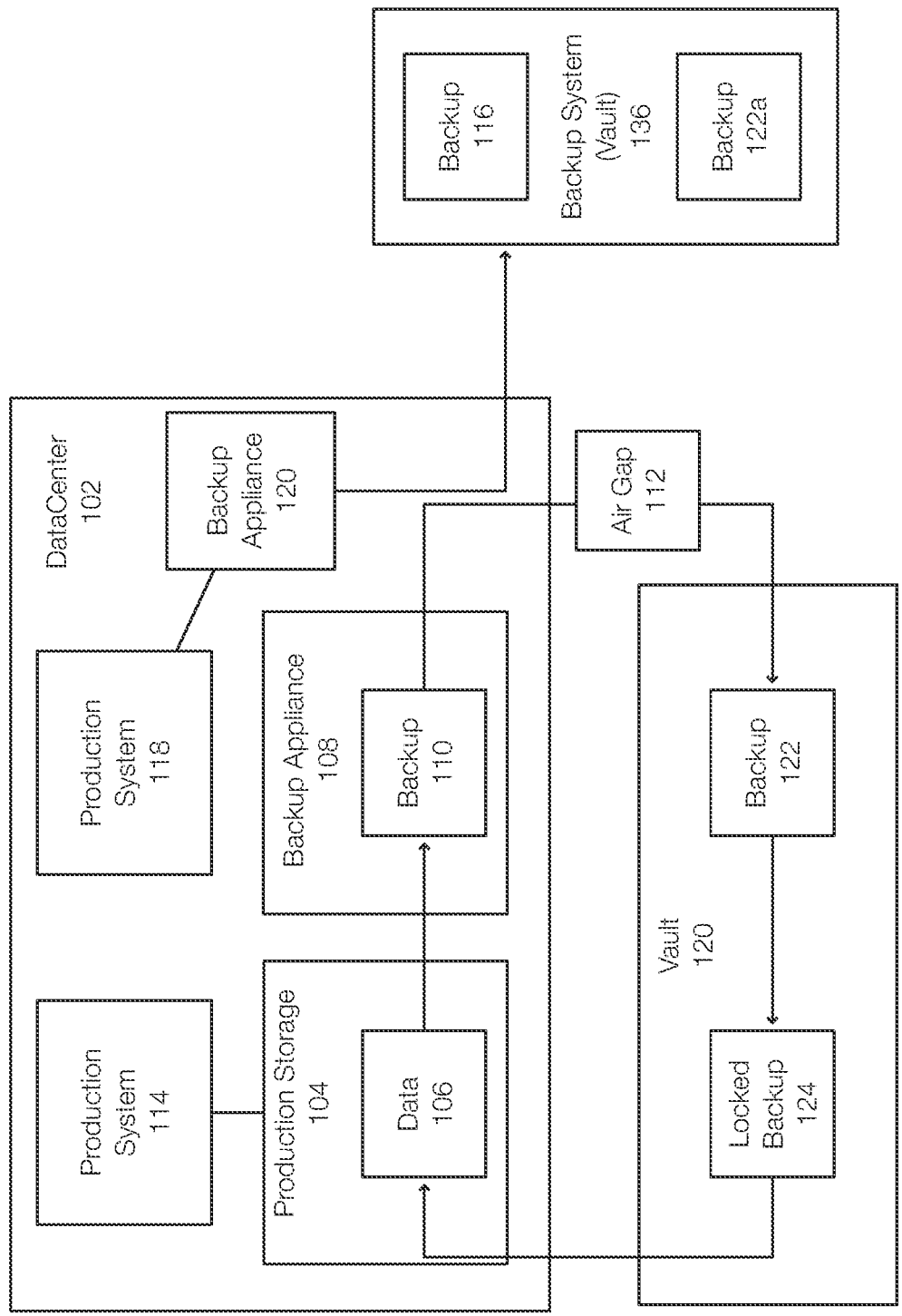
FIG. 1 discloses aspects of a backup system configured to protect a production system.

Backup systems can be arranged in different manners and configurations. FIG. 1 discloses aspects of a data protection system. FIG. 1 illustrates a datacenter 102 in which production systems 114 and 118 may operate. The production system 114 may include production storage 104 configured to store production data 106, which may be generated by a production computing system. The datacenter 102 or the production systems 114 and 118 may also host applications associated with the data in the respective systems. The production data 106 may include data required or accessed by users, applications, or the like. The data 106 may include files, objects, blocks, a database, emails, images, videos, documents, spreadsheets, presentations, or the like or combination thereof.

Although FIG. 1 illustrates production storage 104 of a production system 114, the production storage 104 may be an on-premise storage system, an edge system storage, a cloud-based system or the like or combination thereof. The production storage 104 may include storage devices such as hard disk drives. The datacenter 102 may also include another production system 118 that may be associated with its own production storage and which may be backed up by the appliance 120 (or the backup appliance 118). In this example, the backup 116 of the production system 118 is stored in a backup system 136, which may be an example of the vault 120. In another example, the production systems 114 and 118 may be applications of the same production system that are backed up to different vaults or to different backup systems.

More specifically, a backup appliance 108 (or other backup device or application or virtual backup device, virtual appliance, or application) is configured to generate and store backups of the data 106 (and/or applications), represented as the backup 110, for the production system 114. The backup 110 may be or include a full backup, a synthetic backup, incremental backups, snapshots, or the like. The backup appliance 108 may be a virtual appliance or a physical appliance. The backup appliance 108 may coordinate with other backup appliances at remote locations. This allows backups to be stored remotely.

More generally, the backup appliance 108 may protect data, applications, or the like. The backup appliance 108 may transmit the backup 110 to a vault 120, which may be protected by an air gap 112 controlled by the vault 120. This allows a backup 122 (e.g., a backup) of the data 106 to be stored in the vault 120 only when a connection is available (e.g., the air gap 112 is configured to allow communications). After ingestion into the vault 120, the backup 122 is locked to generate a locked backup 124. The locked backup 124 is immutable in one example. The vault 120 may be created in the datacenter 102 or in another location that is remote from the data 106 and/or the backup appliance 108. In other examples, backups may be stored in storage systems that are not protected by an air gap mechanism. For example, the backup appliance 108 or 120 may regularly transmit backups to a backup system 136 in the cloud or other location. The backup system 136, however, may also be an air gap protected vault.

During a recovery operation, the data 106 may be recovered from the locked backup 124 (or other backup in the vault 120). The vault 120 may store point in time (PiT) copies as well. In some examples, the data 106 may be recovered from the backup 122 if necessary. In one example, the backup 110 may be a namespace that is backed up to a namespace in the vault 120. The backup 110 may be transmitted to a namespace in the vault 120 as the backup 122. Next, the backup 122 may be copied to another namespace and retention locked, which results in the locked backup 124.

The air gap 112 may not be required but provides a more secure backup environment. Once the locked backup 124 is generated and retention locked, the immutability is guaranteed in one example. For example, the locked backup 124 is secure from attack vectors that adversely impact backups because the vault 120 may not be accessible, due to the air gap 112, which is controlled from inside the vault 120 in one example.

In one example, the vault 120 may be a target site configured to store backups received from the backup appliance 108. The vault 120 may be associated with a corresponding appliance that may be configured to store the backups in the target site and also perform restore or recover operations. In one example, the air gap 112 is not present and the value 120 may simply represent backup storage that stores backups received from the backup appliance 108.

In one example, the vault 120 and the backup system 136, particularly when implemented as a vault, are kept separate with no interaction. Embodiments of the invention, however, may store a backup 122*a*, which is a backup of the production system 114 and corresponds to the backup 122, in the backup system or vault 136. This provides a way to recover the production system 114 or its data 106 when the locked backup 124 or backup 122 cannot be decrypted. For example, a key required to decrypt a backup in the vault 120 may be lost and the backup is not accessible. Storing the backup 122*a* in a different vault using a different key may allow the recovery operation to proceed notwithstanding the loss of the key for backups in the vault 120. In general, each vault may be associated with a single key. Different vaults may be associated with different keys. This helps ensure that the inability to access backups in one vault (e.g., decrypt a backup) do not necessarily impact the ability to access backups in a different vault.

Figure 2:
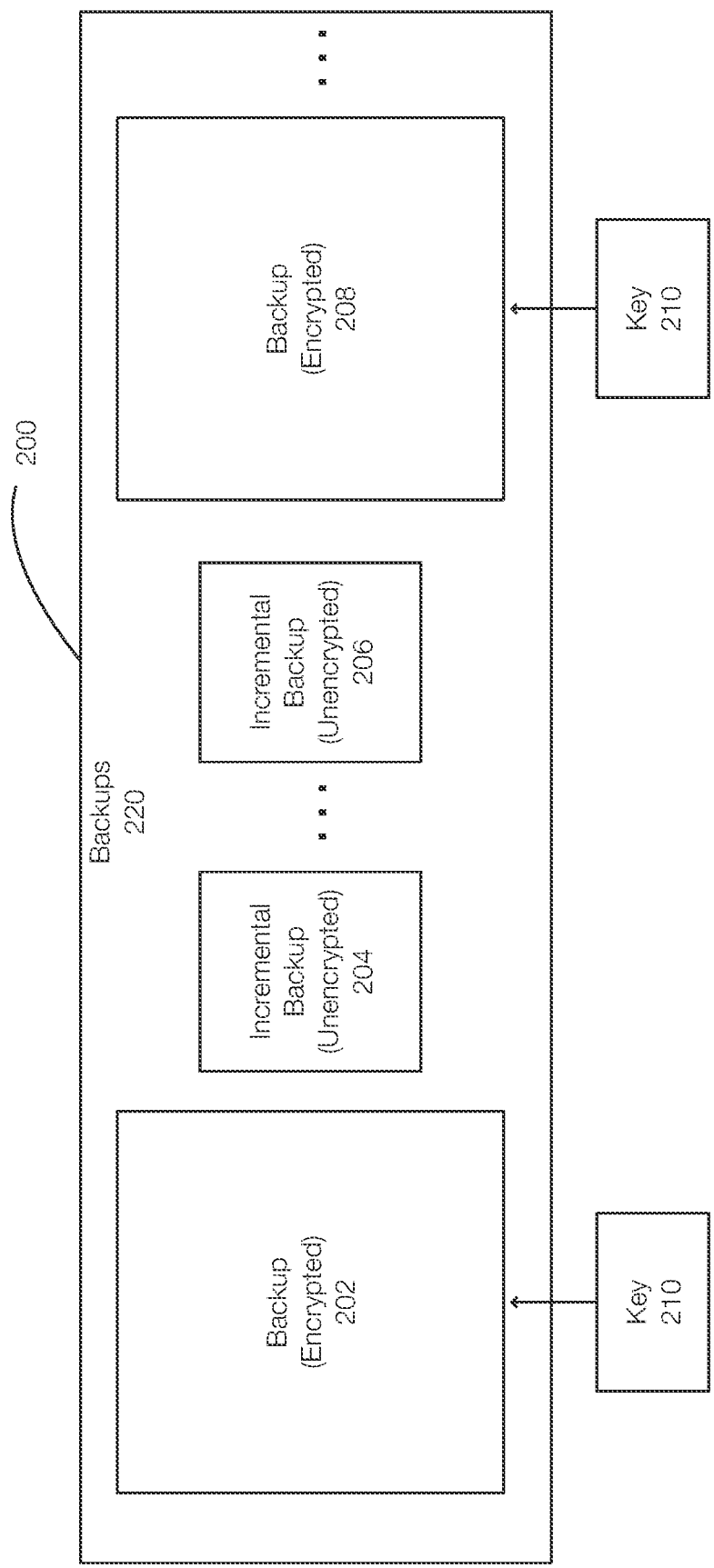
FIG. 2 aspects of backups in accordance with embodiments of the invention.

FIG. 2 discloses aspects of backups in accordance with embodiments of the invention. FIG. 2 illustrates an example of backups 220 that may be stored in a backup storage system or in a vault 200. The vault 200 stores backups 220 of a production system or of a set of application. In this example, the backups 220 include a backup 202, an incremental backup 204, an incremental backup 206, and another backup 208. The backups 202 and 208 may be full backups or full snapshots.

The backups 204 and 206 are incremental backups. Thus, to recover to the backup represented by the incremental backup 206, the backup 202 and intervening incremental backups (the incremental backup 204) are needed. The backup 208 can be recovered without any prior incremental backups.

The backup 202 is encrypted with a key 210 and the backup 208 is encrypted with the same key 210. The incremental backups 204 and 206 are unencrypted in this example. The incremental backups 204 and 206, in addition, are actual difference incremental backups rather than new data-based backups. More specifically, the backup 202 may be generated at time t1 and the incremental backup 204 may be generated at time t2. The incremental backup t2 may be a difference between contents of production data (e.g., a volume) at t2 less contents of the production data (the volume) at time t2. This is distinct from an incremental backup that includes new data written to the volume or the production data between times t1 and t2.

By making the incremental backups 204 and 206 difference backups, an attacker may have more difficulty reading or making sense of the incremental backups 204 and 206 even when not encrypted. If they were new data backups, the new data could be easily read if unencrypted.

In one example, the key 210 may be lost or unavailable for other reasons (e.g., deleted by an attacker). This may cause the backup 202 to be unrecoverable. Further the incremental backups 204 and 206 may not be useful without the backup 202.

Figure 3:
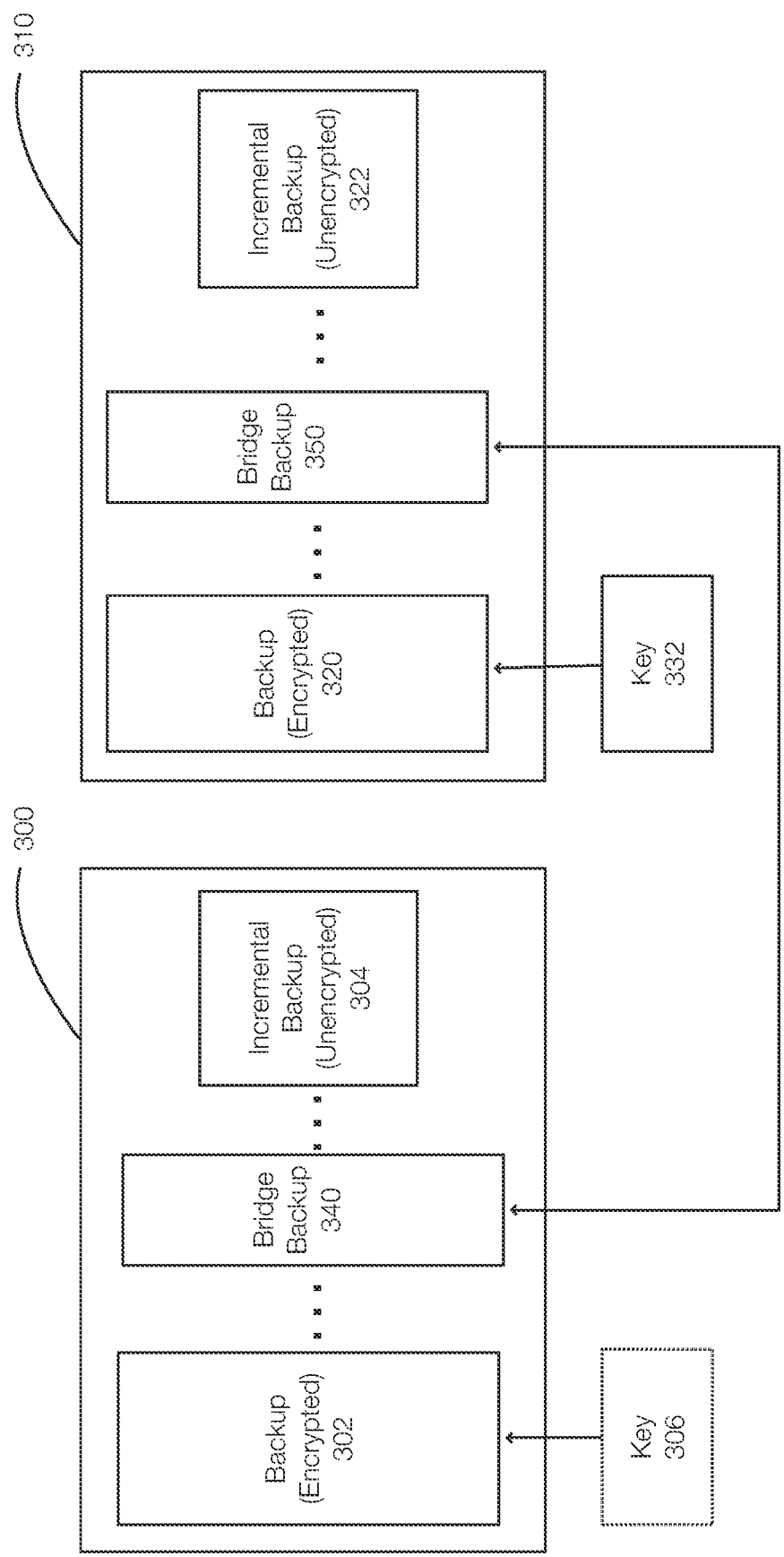
FIG. 3 discloses aspects of storing backups that allow the backups to be recovered in the event that a key to a backup is lost, deleted, or unavailable for other reasons.

FIG. 3 is discussed with reference to backups such as full backups and incremental backups. Full snapshots and incremental snapshots are examples of, respectively, full backups and incremental backups. FIG. 3 discloses aspects of storing backups that allow backups to be recovered in the event that a key is lost, deleted, or unavailable for other reasons. FIG. 3 illustrates an example of recovering a backup when a key required to decrypt the backup is unavailable.

FIG. 3 illustrates two vaults 300 and 310. The vaults 300 and 310 may cooperate to protect the same data, application, or set of applications. The vaults 300 and 310 may share the workload of protecting the data and may have no need to communicate. In general, the vaults 300 and 310 may not have direct overlap. For example, the backups and incremental backups in the vault 300 are distinct from the backups and incremental backups in the vault 310. The vaults 300 and 310 may store data associated with different points in time. As a result, there is little need for the vault 300 to interact with the vault 310. Because they are vaults in this example, there should be little to no communication or access from one of the vaults 300 and 310 to the other of the vaults 300 and 310. There would be little reason to communicate even if they were separate backup storage systems rather than vaults. However, the vaults may be used as a last resort recovery mechanism.

In this example, the vaults 300 and 310 share a data protection workload and the backups stored by these vaults, including full and/or incremental backups (or snapshots), correspond to different points in time in some examples.

More specifically, the vault 300 includes an encrypted backup 302 and unencrypted incremental backup 304. The vault 310 is separate and independent of the vault 300 but shares the same timestamp. The vault 310 stores an encrypted backup 320 that is encrypted with a key 332 and associated unencrypted incremental backup 322. As previously discussed, the backup 302 and the backup 320 are different backups that correspond to different points in time. Further, the incremental backups 304 and 322 are distinct and correspond to different points in time and different to different full backups. A recovery operation may need to use both of the vaults 300 and 310 to successfully recover a production system.

In the vault 300, the incremental backups associated with the backup 302 include at least a bridge backup 340 and an incremental backup 304. In the vault 310, the incremental backups associated with the backup 320 include at least an incremental backup 322 and a bridge backup 350.

In this example, the bridge backup 340 and the bridge backup 350 correspond to the same point in time or the same timestamp. Further, the bridge backups 340 and 350 are, in FIG. 3, incremental backups. These incremental backups are references as bridge backups 340 and 350, by way of example, because they refer to the same point in time. The arrow connecting the bridge backups 340 and 350 illustrate that they have the same timestamp and allow a recovery operation to bridge from one vault to another vault. However, the bridge backup 340 and the bridge backup 350 may be different types. For instance, although the bridge backup 350 is illustrated as an incremental backup, the bridge backup 350 may be a full backup. Further, even if both the bridge backups 340 and 350 are incremental backups, their content may be different.

Generally, because the vaults 300 and 310 cooperate to generate backups (e.g., the vaults 300 and 310 generate full backups at different timestamps), the bridge backups in one vault may be different from the bridge backups in another vault. For example, the bridge backup 350 in the vault 310 may have a timestamp that is identical or the same as a timestamp of the bridge backup 340 in the vault 300. As previously stated, the bridge backup 350 is not necessarily a copy of the bridge backup 340 because the vaults 300 and 310 are configured to cooperate, as previously stated, in the process of protecting a system rather than generate identical backup copies. More specifically, the bridge backups 340 and 350, even though corresponding to the same point in time, may be different because they are difference incremental backups from the previous point in time backup in their respective vaults. For example, the bridge backup 340 having a timestamp of t6 may be an incremental backup based on a previous incremental (or full) backup with a timestamp of t5. The bridge backup 350 also has a timestamp of t6 but is based on an incremental (or full) backup with a timestamp of t4. Thus, the bridge backups 340 and 350 have the same timestamp but different content. However, embodiments of the invention ensure that each of the vaults 300 and 310 include a backup of some time with a timestamp that is the same as a timestamp of a backup of the other vault.

In this example, the bridge backup 350 is an incremental backup and is, as a result, unencrypted. However, a full backup that is encrypted with the key 332 may also be the bridge backup. For a system being recovered and by way of example, the vault 300 may be a first vault and the vault 310 may be a second vault, for example when the point in time to be recovered is in the vault 300.

For example, there may be a need to perform a recovery to a point in time represented by the incremental backup 304. In the event that the key 306, used to decrypt the backup 302, is lost and the backup 302 cannot be recovered, the recovery operation cannot recover the production system to the point in time represented by the incremental backup 304.

Embodiments of the invention allow the backups in the vault 310 to aid in the recovery operation. Recovering to the incremental backup 304 using the vault 310 may include identifying the bridge backups 340 and 350. Generally, the timestamp of the bridge backups may be earlier in time than the timestamp of point in time selected for recovery.

Embodiments of the invention may thus configure the data protection workload to ensure that the vault 310 includes at least one bridge backup 340 and that the vault 300 includes at least one bridge backup 340.

For example, a decision may be made to recover to the incremental backup 304. Because the key 306 is lost or unavailable, the bridge backups 340 and 350 are identified. Next, the backup 320 is identified based on the bridge backup 350 in the vault 310. Once the backup 320 is identified, the recovery operation may begin by recovering the production system using the backup 320 and all incremental backups up to the bridge backup 350. This may result in a partially recovered production system.

Next, the recovery operation continues and switches back to the backups in the vault 300. Thus, the recovery operation applies all incremental backups from the bridge backup 340 to the incremental backup 304. This allows the production system to be recovered to the point in time represented by the incremental backup 304 even though the full backup 302 is unavailable.

The bridge backups 340 and 350, along with unencrypted incremental backups (difference backups in one example) ensure that a specific point of time from either of the vaults 300 and 310 can be recovered when one of the keys 306 and 332 is lost or unavailable. In one embodiment, there is at least one bridge backup between each two full backups.

Thus, the data protection system ensures that there is a bridge backup in each vault that has the same timestamp as a bridge backup in the other vault. The bridge backups can be of different types or of the same type. Even if of the same time, the content may differ. Rather, the recovery operation can recover up to the bridge backup in one vault and continue the recovery operation starting from the bridge vault in the other vault.

Embodiments of the invention thus host full snapshots or full backups of a system in their corresponding vault (or vaults) and/or on other backup storage systems. The full backups are associated with bridge backups. This allows recovery operations to specific points in time to be performed using backups (e.g., bridge backups) when a backup (the full backup) in the selected vault cannot be accessed.

Figure 4:
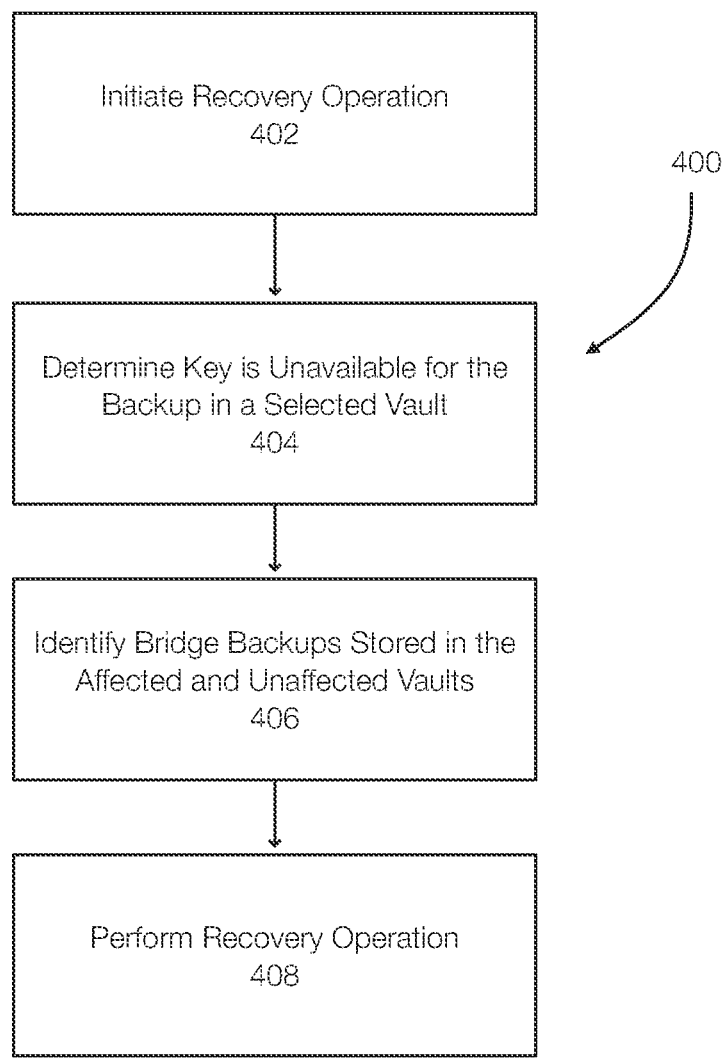
FIG. 4 discloses aspects of a recovery operation when a backup stored in a backup storage or vault cannot be accessed.

FIG. 4 discloses aspects of a recovery operation. The method 400 includes initiating 402 a recovery operation. The recovery operation may be initiated for a variety of reasons such as corrupted data, faulty hardware, malware, or the like. During the recovery operation, the data protection system may determine 404 that a key required to decrypt a specific backup is unavailable. For example, the key may be lost or may have been deleted by an attacker.

More specifically, the recovery operation may have identified a particular backup to recover from a first or selected vault (or other backup storage system) that stores multiple backups. The recovery point to recover may correspond to a full backup and/or one or more incremental backups. After the recovery point is identified, the data protection system determines that the full backup (e.g., the full snapshot) cannot be accessed because the key needed for decryption is lost or unavailable.

Thus, the full backup from the selected or first vault cannot be used. The data protection system identifies 406 bridge backups. One of the bridge backups is in the selected or first vault and a corresponding bridge backup is stored in a different or second vault. This allows the recovery operation to be performed 408 using the bridge backups. The recovery process starts from the encrypted full backup associated with the bridge backup in the second vault. Thus, the encrypted full backup in the second vault is decrypted if necessary and any relevant incremental backups the second vault up to the bridge backup are applied to the decrypted full backup to generate a partially recovered production system. The recovery operation then reverts to the first vault to continue the recovery operation by applying incremental backups up to the recovery point stored in the first vault after the bridge backup in the first vault. This allows the recovery operation to be successfully performed 408 even though the key was unavailable for the backup stored in the first vault.

Embodiments of the invention thus allow the backups stored on other vaults to be used for last-resort access and to perform a recovery operation when a selected vault cannot be used, for example due to key unavailability.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment. VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups, difference backups or data-based difference backups.

It is noted that any operation(s) of any of these methods disclosed herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method comprising: initiating a recovery operation to recover a production system, identifying a point in time for the recovery operation, wherein the point in time is associated with an initial backup stored in a first vault associated with the production system, determining that a first key needed to decrypt the initial backup in the first vault is unavailable, identifying a starting backup in a second vault associated with the production system, identifying a second bridge backup stored in the second vault that is after the starting backup in the second vault, recovering the production system up to the second bridge backup using the starring backup and the second bridge backup in the second vault, and continuing to recover the production system from a first bridge backup stored in the first vault to incremental backup in the first vault corresponding to the point in time.

Embodiment 2. The method of embodiment 1, wherein the point in time for the recovery operation is associated with the initial backup and/or one or more incremental backups.

Embodiment 3. The method of embodiment 1 and/or 2, wherein the one or more incremental backups stored in the first vault are unencrypted.

Embodiment 4. The method of embodiment 1, 2, and/or 3, wherein each of the one or more incremental backups is a difference incremental backup and wherein the initial backup and the starting backup are full backups.

Embodiment 5. The method of embodiment 1, 2, 3, and/or 4, wherein the second bridge backup stored in the second vault corresponds to a same point in time as the first bridge backup stored in the first vault.

Embodiment 6. The method of embodiment 1, 2, 3, 4, and/or 5, wherein the bridge backups include one or more of difference backups and/or full backups.

Embodiment 7. The method of embodiment 1, 2, 3, 4, 5, and/or 6, wherein the first vault is connected via an air gap to a backup appliance that generates backups of the production system.

Embodiment 8. The method of embodiment 1, 2, 3, 4, 5, 6, and/or 7, wherein the first vault comprises a backup storage system.

Embodiment 9. The method of embodiment 1, 2, 3, 4, 5, 6, 7, and/or 8, further comprising recovering the backup using the starting backup from the second vault and incremental backups from the first vault and/or the second vault, wherein the starting backup is a full snapshot and wherein the one or more incremental backups are incremental snapshots.

Embodiment 10. The method of embodiment 1, 2, 3, 4, 5, 6, 7, 8, and/or 9, wherein the second key is known to the second vault.

Embodiment 11 A system, comprising hardware and/or software, operable to perform any of the operations, methods, or processes, or any portion of any of these, disclosed herein.

Embodiment 12 A non-transitory storage medium having stored therein instructions that are executable by one or more hardware processors to perform operations comprising the operations of any one or more of embodiments 1-11.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, agent, client, or the like may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
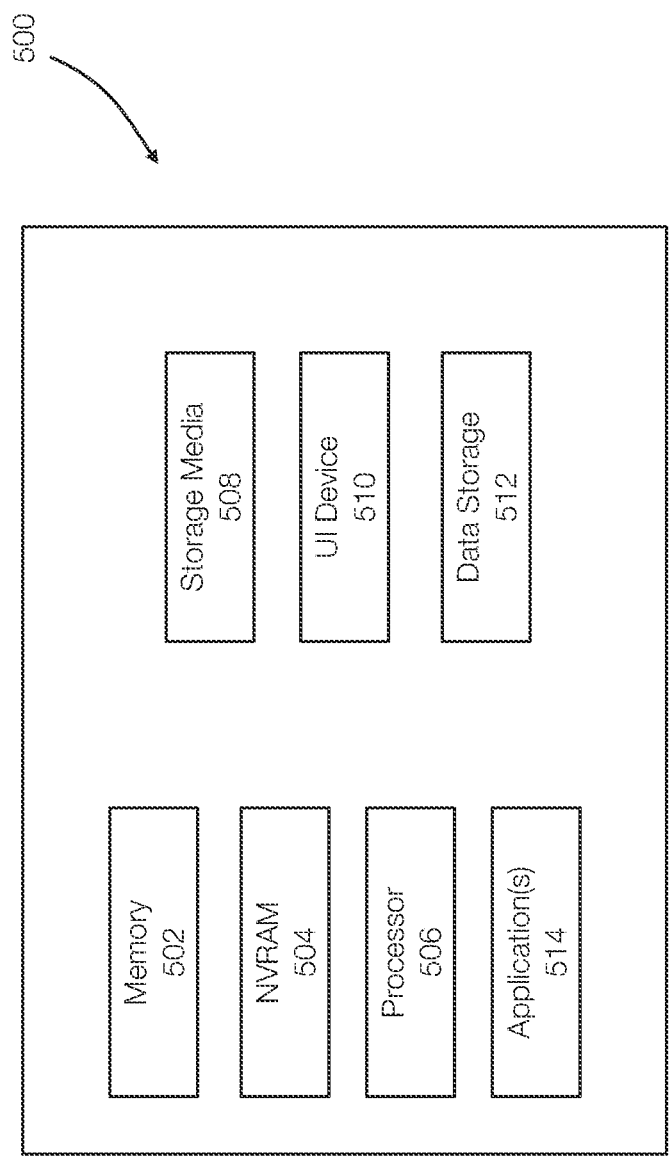
FIG. 5 discloses aspects of a computing device, system, or entity.

With reference briefly now to FIG. 5, any one or more of the entities disclosed, or implied, by the Figures, and/or elsewhere herein, may take the form of, or include, or be implemented on, or hosted by, a physical computing device, one example of which is denoted at 5. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid-state device (SSD) storage. As well, one or more applications 514 may be provided that comprise instructions executable by one or more hardware processors 506 to perform any of the operations, or portions thereof, disclosed herein. The device 500 may also represent a computing environment such as an edge system, a cloud-based system, a cluster of resources or the like.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   initiating a recovery operation to recover a production system;
   identifying a point in time for the recovery operation, wherein the point in time is associated with an initial backup stored in a first vault associated with the production system;
   determining that a first key needed to decrypt the initial backup in the first vault is unavailable;
   identifying a starting backup in a second vault associated with the production system;
   identifying a second bridge backup stored in the second vault that is after the starting backup in the second vault;
   recovering the production system up to the second bridge backup using the starting backup and the second bridge backup in the second vault; and
   continuing to recover the production system from a first bridge backup stored in the first vault to an incremental backup in the first vault corresponding to the point in time,
   wherein the first bridge backup and the second bridge backup share a common point in time, the starting backup has a point in time prior to the point in time of the first and second bridge backups, and the incremental backup has a point in time after the point in time of the first and second bridge backups.

2. The method of claim 1, wherein the point in time for the recovery operation is associated with the initial backup and/or one or more incremental backups.

3. The method of claim 2, wherein the one or more incremental backups stored in the first vault are unencrypted.

4. The method of claim 3, wherein each of the one or more incremental backups is a difference incremental backup and wherein the initial backup and the starting backup are full backups.

5. The method of claim 3, wherein the second bridge backup stored in the second vault corresponds to a same point in time as the first bridge backup stored in the first vault.

6. The method of claim 1, wherein the bridge backups include one or more of difference backups and/or full backups.

7. The method of claim 1, wherein the first vault is connected via an air gap to a backup appliance that generates backups of the production system.

8. The method of claim 1, wherein the first vault comprises a backup storage system.

9. The method of claim 2, further comprising recovering the backup using the starting backup from the second vault and incremental backups from the first vault and/or the second vault, wherein the starting backup is a full snapshot and wherein the one or more incremental backups are incremental snapshots.

10. The method of claim 9, wherein a second key is known to the second vault.

11. A non-transitory storage medium having stored therein instructions that are executable by one or more hardware processors to perform operations comprising:
  initiating a recovery operation to recover a production system;
  identifying a point in time for the recovery operation, wherein the point in time is associated with an initial backup stored in a first vault associated with the production system;
  determining that a first key needed to decrypt the initial backup in the first vault is unavailable;
  identifying a starting backup in a second vault associated with the production system;
  identifying a second bridge backup stored in the second vault that is after the starting backup in the second vault;
  recovering the production system up to the second bridge backup using the starting backup and the second bridge backup in the second vault; and
  continuing to recover the production system from a first bridge backup stored in the first vault to an incremental backup in the first vault corresponding to the point in time,
  wherein the first bridge backup and the second bridge backup share a common point in time, the starting backup has a point in time prior to the point in time of the first and second bridge backups, and the incremental backup has a point in time after the point in time of the first and second bridge backups.

12. The non-transitory storage medium of claim 11, wherein the point in time for the recovery operation is associated with the initial backup and/or one or more incremental backups.

13. The non-transitory storage medium of the claim 12, wherein the one or more incremental backups stored in the first vault are unencrypted.

14. The non-transitory storage medium of claim 13, wherein each of the one or more incremental backups is a difference incremental backup and wherein the initial backup is a full backup.

15. The non-transitory storage medium of claim 13, wherein the second bridge backup stored in the second vault corresponds to a same point in time as the first bridge backup stored in the first vault.

16. The non-transitory storage medium of claim 11, wherein the bridge backups include one or more of difference backups and/or full backups.

17. The non-transitory storage medium of claim 11, wherein the first vault is connected via an air gap to a backup appliance that generates backups of the production system.

18. The non-transitory storage medium of claim 11, wherein the first vault comprises a backup storage system.

19. The non-transitory storage medium of claim 12, further comprising recovering the backup using the starting backup from the second vault and incremental backups from the first vault and/or the second vault, wherein the starting backup is a full snapshot and wherein the one or more incremental backups are incremental snapshots.

20. The non-transitory storage medium of claim 19, wherein a second key is known to the second vault.

* * * * *